Nov. 8, 1960 F. R. FLUHR 2,959,690

SWITCHING CIRCUIT

Filed July 2, 1957 2 Sheets-Sheet 1

INVENTOR
FREDERICK R. FLUHR

BY Richard C Reed
ATTORNEYS

INVENTOR
FREDERICK R. FLUHR

BY Richard C. Reed
ATTORNEYS

United States Patent Office 2,959,690

Patented Nov. 8, 1960

2,959,690

SWITCHING CIRCUIT

Frederick R. Fluhr, Fort Foote, Md., assignor to the United States of America as represented by the Secretary of the Navy Filed July 2, 1957, Ser. No. 669,687

3 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention relates in general to an electrical switching circuit and in particular to a switching circuit conditioned by a direct current signal and operated by a pulse waveform in predetermined time intervals.

In the prior art, switching circuits employed electron tubes that were conditioned by a first signal and operated by a second signal. Since these circuits employed electron tubes, they required a large number of components, were comparatively unreliable, and could be conditioned by direct current signals only with great difficulty. The switching circuits in the prior art that employed silicon junction diodes utilized the diodes in bridge circuits. These circuits required four diodes for each switching circuit and raised the difficult problem of properly matching the selected diodes. In addition, whether electron tubes or diodes were used, the switching circuits in the prior art had large current and voltage transients in their output signal.

Accordingly, it is an object of the present invention to provide a reliable electrical switching circuit employing a minimum number of components.

Another object of the present invention is to provide a switching circuit having minimum circuit transients.

Figures 1, 3:
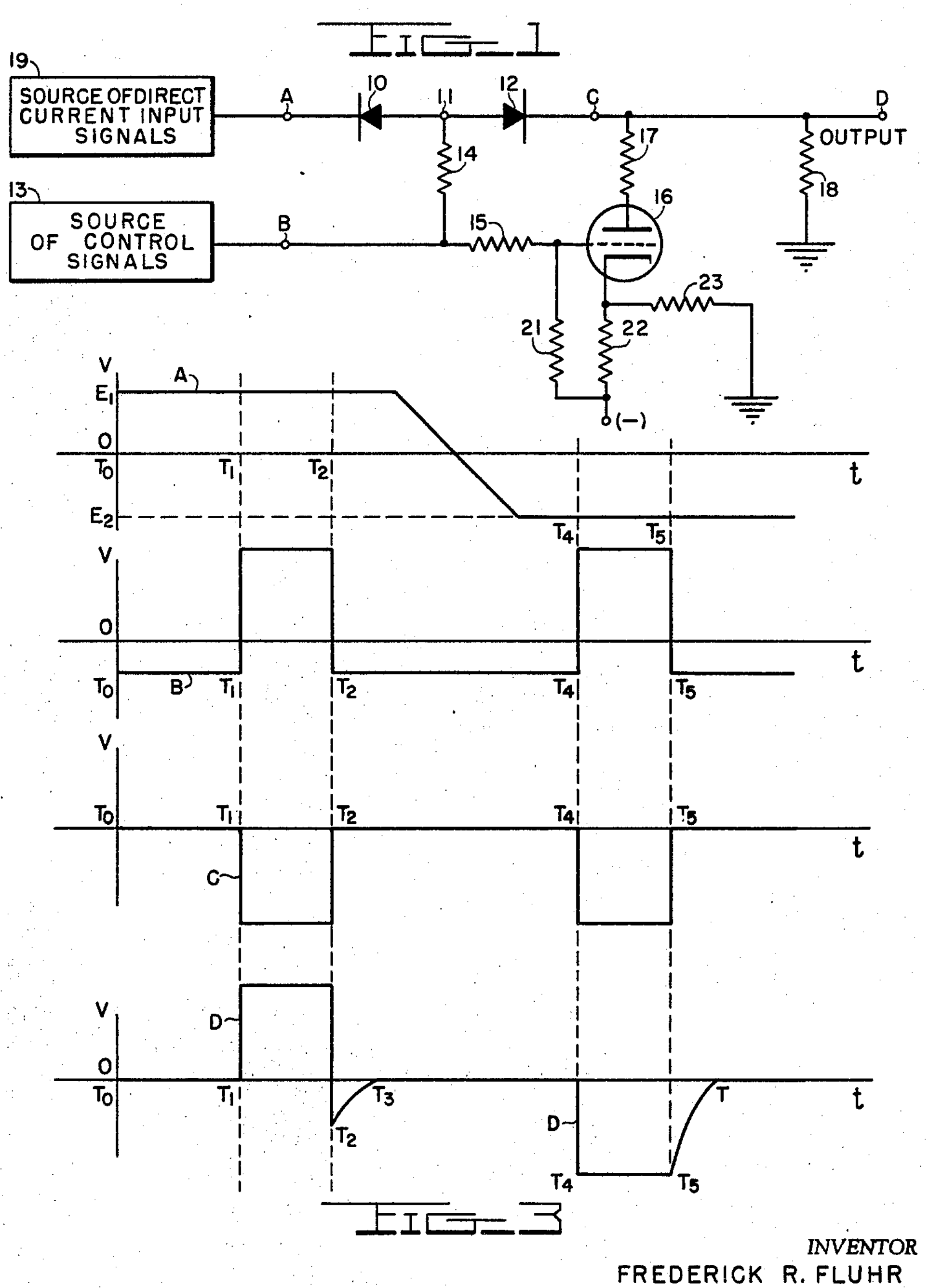
Figure 2:
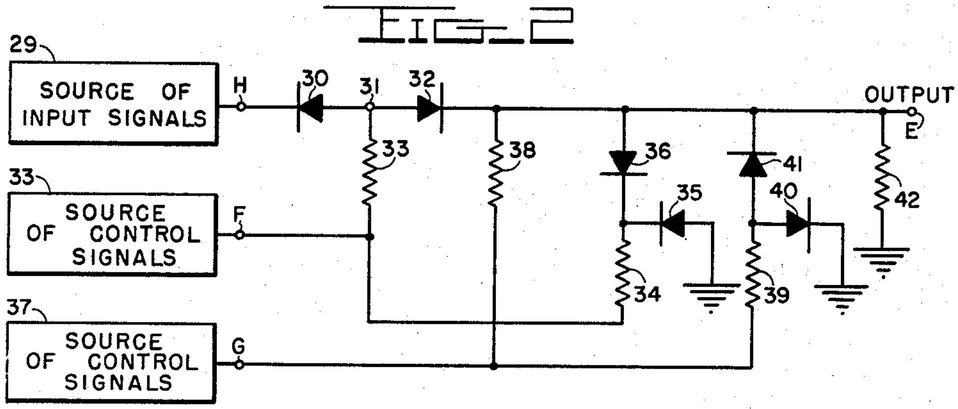
Figure 4:
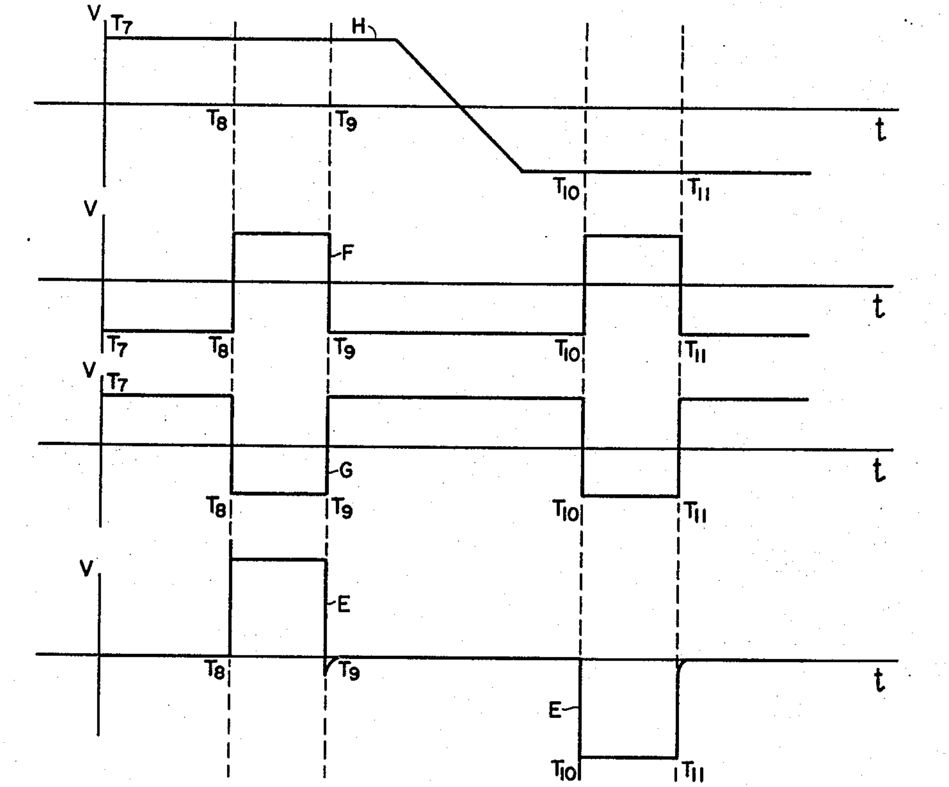

Other objects and many of the attendant advantages of this invention will be readily apparent as the same becomes better understood by reference to the following detailed description when considered in connection with the accompanying drawings wherein:

Fig. 1 discloses a first embodiment of the present invention;

Fig. 2 discloses a second embodiment of the present invention;

Fig. 3 represents waveforms at selected points in the embodiment shown in Fig. 1; and Fig. 4 represents waveforms at selected points in the embodiment shown in Fig. 2.

In accordance with the present invention, an electrical switching circuit is provided in which a first unilateral impedance device and a second unilateral impedance device are connected in series. A direct current input signal is applied to the first unilateral impedance device to condition the electrical switching circuit for operation and a first control signal and a second control signal are applied to the first unilateral impedance device and the second unilateral impedance device, respectively, to operate the electrical switching circuit in predetermined time intervals. When operated, the switching circuit provides an output signal in dependency on the direct current input signal.

Referring to Fig. 1, unilateral impedance device 10 is connected in the high conduction direction between terminals 11 and A and unilateral impedance device 12 is connected in the high conduction direction between terminals 11 and C. Thus, unilateral impedance devices 10 and 12 are connected front to front. It is understood that unilateral impedance devices 10 and 12 may be connected back to back so long as the unilateral impedance devices are connected in series and in inverse polarity. A source of control signals 13 is connected through terminal B and resistor 14 to terminal 11 and through resistor 15 to the control grid of electron tube 16. The anode of electron tube 16 is connected through resistor 17 to unilateral impedance device 12. Unilateral impedance device 12 and terminal D are connected to ground through resistor 18. And, a source of direct current input signals 19 is connected to terminal A.

In the arrangement shown in Fig. 1, unilateral impedance devices 10 and 12 may be any high quality silicon diodes so long as the diodes have extremely high back impedance and high forward conduction. For example, the unilateral impedance devices may be conventional diodes 1N458 or 1N458A. Resistor 18 should have a very high resistance and source of direct current input signals 19 should have a comparatively low impedance in comparison with the conduction impedance of unilateral impedance devices 10 and 12. Thus, if when 5 milliamperes flows through unilateral impedance devices 10 and 12, the sum of the high conduction impedances of the unilateral impedance devices is less than 500 ohms, the source of direct current input signals 19 should have a source impedance of less than 100 ohms and resistor 18 should have a resistance of approximately 100,000 ohms. Source of control signals 13 may apply a control signal to terminal B that has any period that is consistent with the pulse width of the control signal. The magnitude of the control signal applied by source of control signals 13 to terminal 11 in a predetermined polarity must be greater than the level of the input signal applied to terminal A in the predetermined polarity of the control signal. Electron tube 16 may be any conventional triode such as a 6C4; and preferably, resistors 15, 21, 22 and 23 are selected to give electron tube 16 an operating condition such that the anode of electron tube 16 will have a voltage whose value is substantially −V when the control signal provided by source of control signals 13 has a value of +V.

Referring to Fig. 3, waveforms A and B are applied by source of direct current input signals 19 and source of control signals 13 to terminals A and B, respectively, in Fig. 1. During time interval $T_0$–$T_1$, the negative voltage of waveform B is applied to terminal 11 and to the control grid of electron tube 16, thereby cutting off the electron tube and raising the impedance of unilateral impedance devices 10 and 12. (Unilateral impedance devices 10 and 12 are substantially open circuit.) At time $T_1$ the leading edge of the positive voltage of waveform B is applied to terminal 11 and to the control grid of electron tube 16. The electron tube conducts and applies the leading edge of the negative voltage of waveform C to terminal C. Thus, the impedances of unilateral impedance devices 10 and 12 are lowered; and since the circuit between terminals A and D is closed, the leading edge of waveform D appears across resistor 18. At time $T_2$ when the trailing edge of waveform B is applied to terminal B and the trailing edge of waveform C is applied to terminal C, raising the impedances of unilateral impedance devices 10 and 12, the trailing edge of waveform D appears across resistor 18. The portion of waveform C between $T_2$ and $T_3$ is dependent on the circuit transients which are attributed primarily to the holes stored in unilateral impedance devices 10 and 12 and the stray capacitance of the circuit wiring.

In a similar manner, during the time interval $T_4$–$T_5$, the impedance of unilateral impedance devices 10 and 12 are lowered by the control signal applied to terminal B and waveform C applied to terminal C in Fig. 1 and the portion of waveform D shown in this time interval in Fig. 3 appears across resistor 18. The portion of waveform D in time interval $T_5$–$T_6$ is dependent on the circuit transients.

Referring to Fig. 2, unilateral impedance device 30 is connected in the high conduction direction between terminals 31 and H and unilateral impedance device 32 is connected in the high conduction direction between terminals 31 and E. Thus, unilateral impedance devices 30 and 32 are connected front to front. It is understood that unilateral impedance devices 30 and 32 may be connected back to back so long as the unilateral impedance devices are connected in series and in inverse polarity. A first source of control signals 33 is connected to terminal 31 through terminal F and resistor 33 and to ground through resistor 34 and unilateral impedance device 35. Unilateral impedance device 36 is connected between unilateral impedance devices 32 and 35. A second source of control signals 37 is connected through terminal G and resistor 38 to unilateral impedance device 32 and through resistor 39 and unilateral impedance device 40 to ground. Unilateral impedance device 41 is connected between unilateral impedance devices 32 and 40. Resistor 42 is connected between terminal E and ground. It is noted that unilateral impedance devices 35 and 36 are connected back to back and that unilateral impedance devices 40 and 41 are connected front to front. It is, of course, understood that all of the unilateral impedance devices shown in Fig. 2 could have their directions reversed simultaneously with the interchange of source of control signals 33 and 37.

Referring to Fig. 4, waveforms H, E, F and G are applied to terminals H, E, F and G by source of input signals 29, source of control signals 33 and source of control signals 37, respectively, in Fig. 2. During the time interval $T_7$–$T_8$, the negative voltage of waveform F is applied to and lowers the impedance of unilateral impedance device 35 and the positive voltage of waveform G is applied to and lowers the impedance of unilateral impedance device 40. Thus, the output circuit of the arrangement shown in Fig. 2 is effectively clamped to ground through unilateral impedance devices 40 and 41 and through unilateral impedance devices 35 and 36. During time interval $T_8$–$T_9$, the positive voltage of waveform F is applied to unilateral impedance devices 30 and 35 and the negative voltage of waveform G is applied to unilateral impedance devices 32 and 40. This lowers the impedances of unilateral impedance devices 30 and 32 closing the circuit between terminals H and E and raises the impedance of unilateral impedance devices 35 and 40 substantially opening the circuits through these devices to ground. Consequently, waveform E appears across resistor 42. In a similar manner, during time interval $T_9$–$T_{10}$ unilateral impedance devices 30 and 32 are substantially open circuit and the output of the arrangement shown in Fig. 2 is effectively clamped to ground. During time interval $T_{10}$–$T_{11}$ the circuit between terminals H and E is closed, the circuits to ground through unilateral impedance devices 35 and 40 are substantially open, and the voltage of waveform E during this time interval appears across resistor 42. It is noted that by clamping the output circuit to ground the transients in the circuit shown in Fig. 1 are substantially reduced in the arrangement disclosed in Fig. 2. The transients at times $T_8$ and $T_9$ are attributed to the inductance and capacitance of the circuit shown in Fig. 2.

It should be understood, of course, that the foregoing disclosure relates to only preferred embodiments of the invention and that numerous modifications or alterations may be made therein without departing from the spirit and scope of the invention as set forth in the appended claims.

What is claimed is:

1. In an electrical switching device, a first unilateral impedance device and a second unilateral impedance device, means connecting said first unilateral impedance device and said second unilateral impedance device in series and in inverse polarity, an output circuit, means connecting said output circuit to said second unilateral impedance device, a first control circuit and a second control circuit, each connecting the output circuit to ground, means connected to said first unilateral impedance device and to said first control circuit for changing the impedance of said first unilateral impedance device and for preventing said first control circuit from connecting said output circuit to ground, means connected to said second unilateral impedance device and to said second control circuit for changing the impedance of said second unilateral impedance device and for preventing said second control circuit from connecting said output circuit to ground, a source of input signals, and means for applying said source of input signals to said first unilateral impedance device.

2. In an electrical switching device, a first terminal, a second terminal, and a third terminal, a first unilateral impedance device, a second unilateral impedance device, means connecting said first unilateral impedance device between said first terminal and said second terminal, means connecting said second unilateral impedance device between said second terminal and said third terminal so that the first unilateral impedance device and the second unilateral impedance device are connected in series and in inverse polarity, an output circuit, means for connecting the output circuit to said third terminal, a first control circuit and a second control circuit, each connecting the output circuit to ground, means for providing a first quiescent signal having a predetermined polarity and magnitude and a first control signal having a predetermined polarity and magnitude, means for applying said first quiescent signal and said first control signal to said second terminal and to said first control circuit, means for providing a second quiescent signal having a polarity opposite to that of the first quiescent signal and for providing a second control signal having a polarity opposite to that of the first control signal, means for applying said second control signal and said second quiescent signal to the third terminal and to the second control circuit, a source of input signals providing direct current signals having a potential level that is less than the predetermined magnitude in the polarity of said first control signal, and means connected between said source of input signals and said first terminal for applying the direct current signals to said first terminal.

3. In an electrical switching device, a first terminal, a second terminal and a third terminal, a first unilateral impedance device, a second unilateral impedance device, means connecting said first unilateral impedance device between said first terminal and said second terminal, means connecting said second unilateral impedance device between said second terminal and said third terminal so that the first unilateral impedance device and the second unilateral impedance device are connected in series and in inverse polarity, an output circuit, means connecting said output circuit to said third terminal, a third unilateral impedance device having a first element and a second element, a fourth unilateral impedance device having a third element and a fourth element, means connecting said second element to said third element so that the third unilateral impedance device and the fourth unilateral impedance device are connected in series and in inverse polarity, means connecting said first element to said third terminal, means connecting said fourth element to ground, a fifth unilateral impedance device having a fifth element and a sixth element, a sixth unilateral impedance device having a seventh element and an eighth element, means connecting said sixth element to said seventh element so that the fifth unilateral impedance device and the sixth unilateral impedance device are connected in series and in inverse polarity, means connecting said fifth element to the third terminal, means connecting said seventh element to ground, means for applying a first control signal to said second terminal and to said second element, means for applying a second control signal to said third terminal and to said sixth element, a source of input signals and means for applying said source of input signals to the first terminal.

References Cited in the file of this patent

UNITED STATES PATENTS

| | | |
|---|---|---|
| 2,762,936 | Forrest | Sept. 11, 1956 |
| 2,781,445 | Stocker | Feb. 12, 1957 |
| 2,807,716 | Steele | Sept. 24, 1957 |
| 2,831,985 | Eckert | Apr. 22, 1958 |

FOREIGN PATENTS

| | | |
|---|---|---|
| 155,593 | Australia | Mar. 9, 1954 |